Jan. 6, 1953

H. H. OKAHARA 2,624,127

ALPHABET GAME DEVICE

Filed Aug. 29, 1950

Hisashi H. Okahara
INVENTOR.

BY *Clarence A. O'Brien
and Harvey B. Jackson*
Attorneys

Jan. 6, 1953

H. H. OKAHARA 2,624,127

ALPHABET GAME DEVICE

Filed Aug. 29, 1950

Hisashi H. Okahara
INVENTOR.

BY *Clarence A. O'Brien*
*and Harvey B. Jacobson*
Attorneys

Patented Jan. 6, 1953

2,624,127

UNITED STATES PATENT OFFICE 2,624,127

ALPHABET GAME DEVICE

Hisashi H. Okahara, Hilo, Territory of Hawaii

Application August 29, 1950, Serial No. 182,105

1 Claim. (Cl. 35—35)

The present invention relates to improvements in educational and game devices and more particularly to the kind of device adapted to teach the alphabet.

An object of the present invention is to provide a novel device whereby the alphabet may be taught.

A further object of the present invention resides in the novel arrangement of switches and switch actuating elements whereby signal means may be actuated as the person learning the alphabet correctly sequentially indicates the letters of the alphabet by inserting switch actuating elements into the switches provided with each of the letters of the alphabet.

Still another object of the present invention resides in the novel electrical circuit provided for the indicating means whereby the indicating means may be actuated as each letter is correctly sequentially pointed out, said signal or indicating means failing to signal when a letter is pointed out in its incorrect sequence.

This invention also has for its objects to provide an educational and game device that is economical to manufacture and of relative simplicity.

The invention also comprises novel details of construction and novel combinations and arrangements of parts, which will more fully appear in the course of the following description.

The form in which I have contemplated applying my invention is clearly illustrated in the accompanying drawings, wherein.

Figure 1:
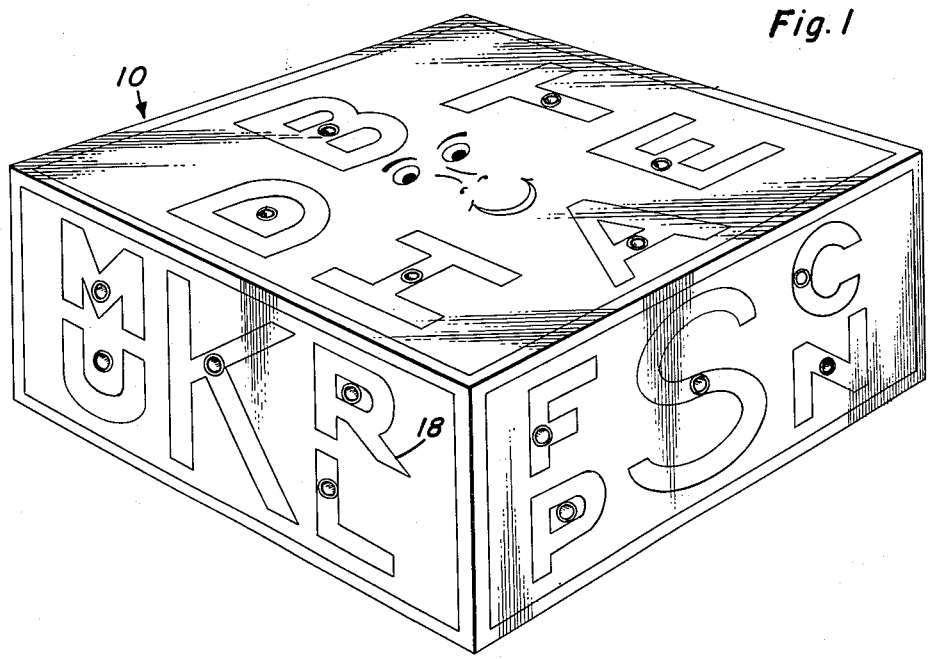
Figure 1 is a perspective view of the alphabet block employed for teaching the alphabet.

Referring more particularly to the drawings, wherein like numerals designate like parts throughout, the numeral 10 designates generally the alphabet block employed with the present invention, the numeral 12 designates generally the plunger, the numeral 14 designates generally the signal means and the numeral 16 designates generally the switch means cooperable with the plunger means 12 for effecting operation of the signal means upon correct sequential insertion of the plunger means 12 into the switches of the letters of the alphabet.

The block 10 is of rectangular cross section and has a plurality of faces upon which indicia means in the form of the letters of the alphabet 18 are inscribed. The letters of the alphabet 18 are positioned at random on the block faces without regard to their sequence in the alphabet. Each of the letters of the alphabet 18 is provided with a bore 20 therethrough and in which an insulating bushing 22 is inserted for slidably receiving plunger means 12.

Secured within the block 10 and to one of its walls, is a battery 24 held by the C-shaped clamp 26 and screws 28. One of the leads of the battery is connected to ground by means of the conductor 30, the material from which the box is made being metallic thereby the box provides a ground for the plurality of switches. The other lead wire from the battery 24 is designated by the numeral 32 and is connected to the electric lamps 34 in series. The electric lamps 34 are supported on the bracket 36 which is supported in insulated relation by the upper wall of the box 10 by means of the screws 38. The bracket 36 provides a connection between the lamps 34.

The switch means 16 includes a first pair of contact elements 40 and 42 which are secured to the inner flange 44 of the bushing 22 and are of resilient arcuated form. The contact 40 has an angulated end portion 46 which extends around the periphery of the flange 44 and is electrically connected to the wall of the box 10. The switch means 16 also includes a third conductor 48 which has a contact element 50 which is juxtaposed to the contact 42 on the first pair of contacts for a purpose to be hereinafter described. Each of the third conductors 48 is connected by means of contact wires 52 to the second conductor 42 on the first pair of contacts in the switch located at the next letter sequentially in the alphabet. Each of the contacts 40 of the first pair of contacts is connected to ground by means of the angulated ends 46, as hereinabove set forth.

The body means 12 includes a plunger 54 having an enlarged handle portion 56 and a reduced diameter end portion 58. The reduced diameter end portion 58 is provided with an electrically conducting covering 60.

Figure 2:
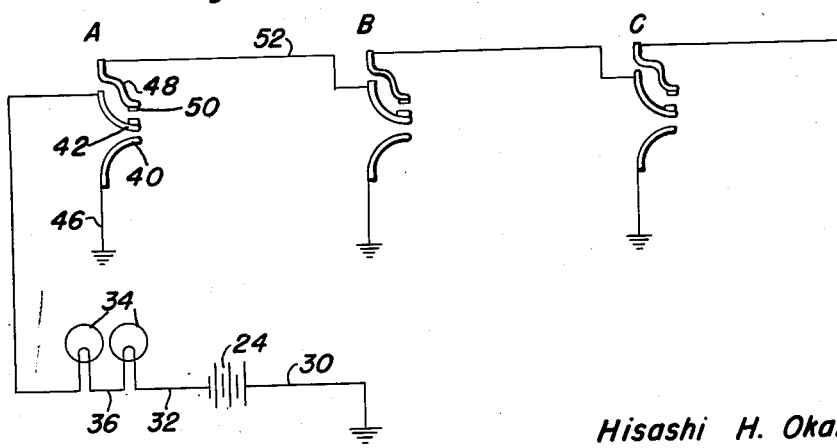
Figure 2 is a diagrammatic view of the electrical system within the block showing the individual switch arrangement for each of the letters of the alphabet.
Figure 3:
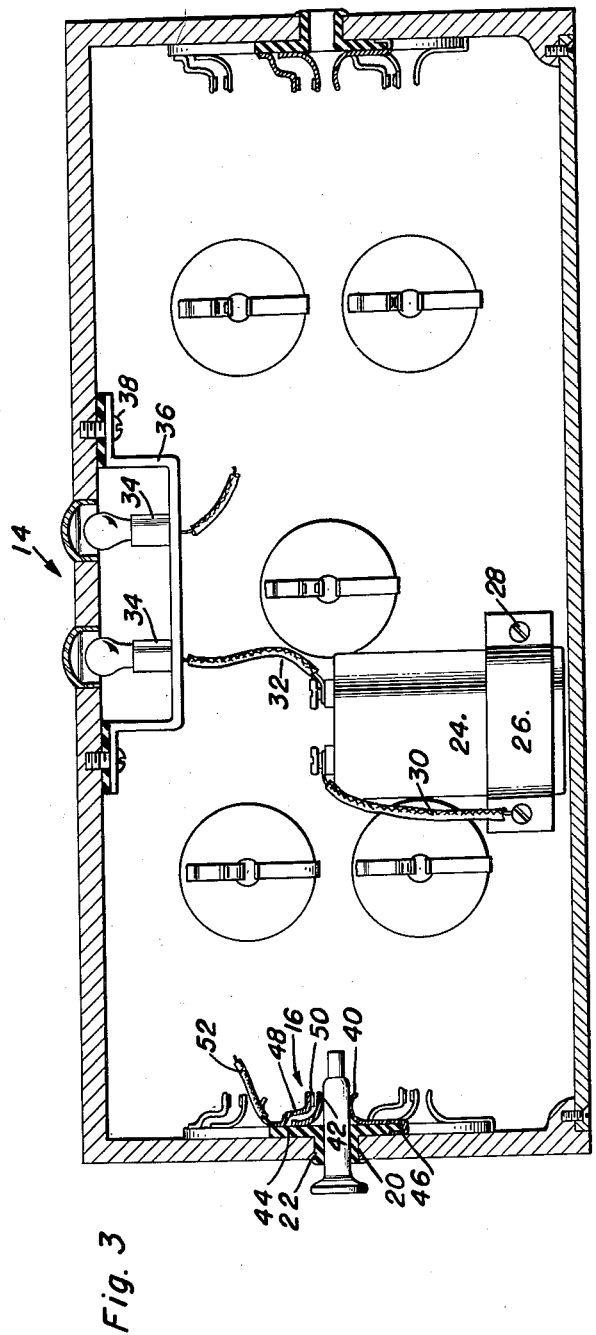
Figure 3 is a detail sectional view taken longitudinally through the alphabet block and showing the interior thereof.
Figure 5:
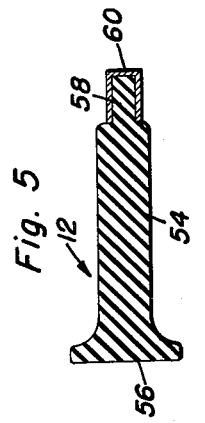
Figure 5 is a detail sectional view of the plunger employed with the present invention.
Figure 4:
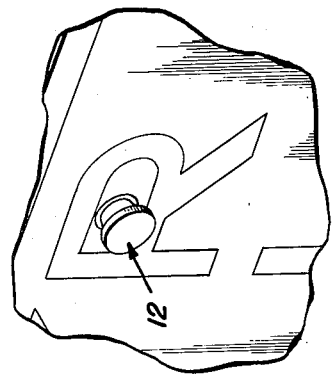
Figure 4 is a detail perspective view showing the plunger inserted into one of the letters of the alphabet.

As will be readily seen in Figures 2 and 3, when the plunger 12 is inserted into the bushing 20 of the letter A and to a first position, the conductive material 60 completes the circuit between the contacts 40 and 42 whereby the electric lamps 34 will be lit. Farther inward movement of the plunger 12 will cause the contacts 40 and 42 to contact the non-conductive portions of the enlarged diameter of the plunger 12 thereby breaking the circuit to the signal lamps. It will also be seen that the second contact 42 will be outwardly urged against the third contact 50 thereby partially closing the circuit to the first switch of the letter B.

The contacts 40 and 42 of the switch of the letter B will be closed by a second plunger 12 in the same manner as the contacts of the switch of letter A, thereby lighting the lamps 34. Similarly, the contacts 42 and 50 of the switch of the letter B will be closed upon further inward movement of the plunger 12, effecting a contact between the contacts 42 and 50 of the letter B, thereby completing part of the circuit for the letter C, et cetera. Thus, the electric lamps 34 will become lit when the contacts of the letters of the alphabet are correctly sequentially actuated. In this manner the alphabet may be taught while providing amusement at the same time. Of course, if the plunger 12 is inserted incorrectly in any of the letters of the alphabet the electric lamps 34 will not be lit by the first inward movement of the plunger nor will farther inward movement of the plunger complete parts of any circuits which will effect lighting of the lamps.

If desired, means other than electric lamps may be provided for signal means, buzzer means being within my contemplation. It is further within the contemplation of my invention to employ domestic electrical current with a conventional low voltage, stepdown transformer for supplying the power for the signal means, and each box may be equipped with means for employing either the batteries or the domestic current.

From the foregoing description taken in conjunction with the drawings, it is believed that the device has been provided which will accomplish all of the objects hereinabove set forth and which will prove of great value for educational purposes.

Having described the invention, what is claimed as new is:

An alphabet game device comprising a housing, indicia means on said housing designating the letters of the alphabet, signal means on said housing, a source of electrical energy, switch means associated with each of said letters, each of said switches including three normally spaced apart contact elements, a common circuit conductor connected to one terminal of said source of energy and to the first contact element of each of said switch means, circuit means connecting said signal means in series circuit relation between the other terminal of said source of energy and the second contact of the switch associated with the A indicia, circuit means connecting the third contact of each switch means with the second contact of the next succeeding switch, excepting the last switch in the series, the third contact of the last switch of the series being connected to said common circuit conductor, each of said indicia means having a bore, switch actuating means insertable in said bores, said actuating means initially bridging said first and second contacts, further insertion of said actuator means removing the bridge between said first and second contacts and moving said second contact into engagement with said third contact.

HISASHI H. OKAHARA.

REFERENCES CITED

The following references are of record in the file of this patent:

UNITED STATES PATENTS

| Number | Name | Date |
|---|---|---|
| 1,617,272 | Peterson | Feb. 8, 1927 |
| 1,881,242 | Prentice | Oct. 4, 1932 |
| 2,492,571 | Goldfarb | Dec. 27, 1949 |
| 2,505,230 | Composto | Apr. 25, 1950 |